(12) United States Patent
Mays

(10) Patent No.: US 9,489,679 B2
(45) Date of Patent: Nov. 8, 2016

(54) SYSTEM AND METHOD FOR AN INTERACTIVE QUERY UTILIZING A SIMULATED PERSONALITY

(71) Applicant: Douglas E. Mays, Chino Hills, CA (US)

(72) Inventor: Douglas E. Mays, Chino Hills, CA (US)

( * ) Notice: Subject to any disclaimer, the term of this patent is extended or adjusted under 35 U.S.C. 154(b) by 315 days.

(21) Appl. No.: 13/656,757

(22) Filed: Oct. 22, 2012

(65) Prior Publication Data

US 2014/0114886 A1    Apr. 24, 2014

(51) Int. Cl.
*G06Q 30/02*    (2012.01)
*G06Q 50/00*    (2012.01)

(52) U.S. Cl.
CPC .............. *G06Q 30/02* (2013.01); *G06Q 50/01* (2013.01)

(58) Field of Classification Search
USPC .......................... 706/11, 12, 60, 61, 920, 934
See application file for complete search history.

(56) References Cited

PUBLICATIONS

Stevens, Intelligent Interactive Video Simulation of a Code Inspection [online], 1989 [retrieved on Aug. 13, 2015]. Retrieved from the Internet:<URL:http://www.google.com/url?sa=t&rct=j&q=&esrc=s&source=web&cd=1&ved=0CB8QFjAAahUKEwibmZO6oqfHAhVlbj4KHR0iA40&url=http%3A%2Fwww.cs.cmu.edu%2F~sms%2FCACM.pdf>.*

\* cited by examiner

*Primary Examiner* — Stanley K Hill
*Assistant Examiner* — Nathan Brown, Jr.
(74) *Attorney, Agent, or Firm* — Ivan M. Posey; Leech Tishman Fuscaldo & Lampl

(57) ABSTRACT

A system and method provides for an interactive query comprising a first input module capable of receiving input for creating a simulated personality for a first user. An expert system is capable of creating and storing the simulated personality. An output module is used for presenting the simulated personality to a second user. An interactive query module is capable of allowing the second user to communicate with the simulated personality of the first user.

11 Claims, 16 Drawing Sheets

SYSTEM AND METHOD FOR AN INTERACTIVE QUERY UTILIZING A SIMULATED PERSONALITY

FIELD OF THE INVENTION

The present invention relates to a system and method for an interactive query utilizing a simulated personality. More specifically, the present invention relates to systems and methods of simulating a personality of a user, providing one or more still or animated images of a user, and providing interactive queries with another user, preferably in the context of social media or social networking.

BACKGROUND OF THE INVENTION

Techniques for personality and emotion simulation have been contemplated and described. For example, Arjan Egges, Sumedha Kshirsagar and Nadia Magnenat-Thalmann of MIRALab—University of Geneva, describe a generic model for personality, mood and emotion simulation for conversational virtual humans in their paper titled Generic Personality and Emotion Simulation for Conversational Agents, Published in Computer Animation and Virtual Worlds archive, Volume 15 Issue 1, March 2004 Pages 1-13. They further present a generic model for updating the parameters related to emotional behavior, as well as a linear implementation of the generic update mechanisms describe a prototype system that uses models in combination with a dialogue system and a talking head with synchronized speech and facial expressions.

With the emergence of 3D graphics, we are now able to create very believable 3D characters that can move and talk. Multi-modal interaction with such characters is possible as the required technologies are getting mature (speech recognition, natural language dialogues, speech synthesis, animation, and so on). However, an important part often missing in this picture is the definition of the force that drives these techniques: the individuality. Egges, Kshirsagar and Magnenat-Thalmann explore structure of this entity as well as its link with perception, dialogue and expression. FIG. 1 depicts how they view the role of personality and emotion as a glue between perception, dialogue and expression.

In emotion simulation research so far, appraisal (obtaining emotional information from perceptive data) is popularly done by a system based on the Ortony, Clore, and Collins model (OCC model). This model specifies how events, agents and objects from the universe are appraised according to respectively their desirability, praiseworthiness and appealingness. The latter three factors are decided upon by a set of parameters: the goals, standards and attitudes. The model delivers us emotional information (i.e. the influence on the emotional state) with respect to the universe and the things that happen/exist in it. In order to have a working model for simulation, one is of course obliged to define the goals, standards and attitudes of the simulator. These factors can be considered as the personality of the simulator. In this case, the personality of a simulator is (partly) domain-dependent. However, more recent research—the OCC model dates from 1988—indicates that personality can be modeled in a more abstract, domain-independent way. In this case, personality is an ensemble of factors/dimensions that each denote an influence on how perception takes place and how behavior is shown. An interface between multi-dimensional and domain-independent personality models and the OCC model does not yet exist. In order to create an integrated model that can handle both appraisal and emotion-based behavior, we need to define how we can use a domain-independent personality model and still use the OCC model for appraisal.

Egges, Kshirsagar and Magnenat-Thalmann, in their paper, investigate the nature of this relationship and propose how to parameterize it so that it can be used in concrete applications.

The effect of personality and emotion on agent behaviour has been researched quite a lot, whether it concerns a general influence on behaviour, or a more traditional planning based method. Various rule-based models, probabilistic models and fuzzy logic systems have been reported in the past. The Egges, Kshirsagar and Magnenat-Thalmann model is not targeted for one specific kind of behaviour synthesizer. They developed a personality and emotion simulator that can be used as a separate module and that can be customized depending on which dialogue system, planning system or reasoning system is used. How behaviour should be influenced by personality and emotion is depending on the application and the system type that is used and it is out of the scope of this paper.

Finally, personality and emotion will have an effect on how behaviour is expressed (speech will have different intonations, a face will make expressions reflecting the emotional state, a body will make different gestures according to the personality and the emotions).

A first step towards such an approach is a system that can simulate personalized facial animation with speech and expressions, modulated through mood. There have been very few researchers who have tried to simulate mood. Vel'asquez proposed a model of emotions, mood and temperament that provides a flexible way of controlling the behaviour of the autonomous entities. Generally, moods and emotions are only differentiated in terms of levels of arousal. Simple models have been proposed for blending, mixing and decaying emotions to subsequently select actions of the agent.

Personality and emotion are basically the same mechanisms only differentiated by two cognitive variables time and duration, and personality can be seen as consistent expression of emotion. An individual is an entity that is constantly changing (having different emotions, moods, etc.). So, when someone speaks of an individual, they always refer to it relative to a time t. The moment that the individual starts existing is defined by t=0. The abstract entity that represents the individual at a time t can be called $I_t$. In the simple case, an individual has a personality and an emotional state (not yet taking mood into consideration). The model based on this assumption is called PE. In one framework, the personality is constant and initialized with a set of values on t=0. The emotional state is dynamic and it is initialized to 0 at t=0. Thus $I_t$ as a tuple ($p, e_t$), where p represents the personality and et represents the emotional state at time t. For example, a person will portray emotions (that change over time) based on what happens, but how she obtains these emotions and the behavior that results from it, depends on a static part of her being, the personality.

From psychology research, there are many personality models that consist of a set of dimensions, where every dimension is a specific property of the personality. Take for example the OCEAN model, which has five dimensions (see Table 1) or the PEN model that has three dimensions.

TABLE 1

The OCEAN model of personality

| Factor | Description | Adjectives used to describe |
|---|---|---|
| Openness | Open mindedness, interest in culture | Imaginative, creative, explorative |
| Conscientiousness | Organized, persistent in achieving goals | Methodical, well organized, dutiful |
| Extraversion | Preference for and behaviour in social situations | Talkative, energetic, social |
| Agreeableness | Interactions with others | Trusting, friendly, cooperative |
| Neuroticism | Tendency to experience negative thoughts | Insecure, emotionally distressed |

Generalizing from these models, it is assumed that a personality has n dimensions, where each dimension is represented by a value in the interval. A value of 0 corresponds to an absence of the dimension in the personality; a value of 1 corresponds to a maximum presence of the dimension in the personality. The personality p of an individual can then be represented by the following vector:

$$p = \begin{bmatrix} \alpha_1 \\ \vdots \\ \alpha_n \end{bmatrix},$$

$$\forall i \in [1, n]: \alpha_i \in [0, 1]$$

As an example, an OCEAN personality can be specified (thus n=5) that is very open, very extravert but not very conscientious, quite agreeable and not very neurotic:

$$p = \begin{bmatrix} 0.8 \\ 0.1 \\ 0.7 \\ 0.5 \\ 0.05 \end{bmatrix}$$

Emotional state has a similar structure as personality. The emotional state is a set of emotions with a certain intensity. The size of this set depends on the theory that is used. For example, in the OCC model, 22 emotions are defined, while others may define 6 that are used as a basis for facial expression classification. The emotional state is something that can change over time (for example due to a decay factor). Therefore, an emotional state can be relative to a time t. The emotional state can be defined $e_t$ as an m-dimensional vector, where all m emotion intensities are represented by a value in the interval [0, 1]. A value of 0 corresponds to an absence of the emotion; a value of 1 corresponds to a maximum intensity of the emotion. This vector is given as follows:

$$e_t = \begin{cases} \begin{bmatrix} \beta_1 \\ \vdots \\ \beta_m \end{bmatrix}, \forall i \in [1, m]: \beta_i \in [0, 1] & \text{if } t > 0 \\ 0 & \text{if } t = 0 \end{cases}$$

Furthermore, an emotional state history $\omega_t$ can be defined that contains all emotional states until $e_t$, thus:

$$\omega_t = <e_0, e_1, \ldots, e_t>$$

An extended version of the PE model can be given by including mood. As such, the individual $I_t$ can be defined as a triple (p, $m_t$, $e_t$), where $m_t$ represents the mood at a time t. Mood has been accepted as the notions of personality and emotional state. Mood is less static than personality and less fluent than emotional state. It is an intermediate form that exists between the two and that describes a rather static state of being that lasts longer than the average emotion as illustrated in FIG. 2. This state of being can be one-dimensional (being in a good or a bad mood) or perhaps multi-dimensional (feeling in love, feeling depressed).

A possibility of having multiple mood dimensions can be defined so a how many dimensions mood actually has can be selected. A mood dimension can be defined as a value that is either negative or positive and that lies in the interval [−1, 1]. Supposing that there are k mood dimensions, the mood can be described by a vector:

$$m_t = \begin{cases} \begin{bmatrix} \gamma_1 \\ \vdots \\ \gamma_k \end{bmatrix}, \forall i \in [1, k]: \gamma_i \in [-1, 1] & \text{if } t > 0 \\ 0 & \text{if } t = 0 \end{cases}$$

Just like for the emotional state, there is also a history of mood, $\sigma_t$, that contains the moods $m_0$ until $m_t$:

$$\sigma_t = <m_0, m_1, \ldots, m_t>$$

Systems such as that provided by Memoirs From Heaven of Temecula, Calif. provide for posthumous letter delivery for men and women of United States armed forces and first responders. Memoirs from Heaven allows for a person's deepest thoughts and feelings, as well as the words left unsaid, to be delivered to your loved ones.

Memoirs From Heaven checks with the Social Security Death Index (SDDI) periodically to determine when to start delivering a person's pre-written letters to pre-determined recipients at pre-determined times based on the scheduled information the user provides when they sign up. The writer may review and revise the letters as often as they would like before they pass away.

However, using the Memoirs From Heaven system and other systems like it, once the writer-user passes away, the writer-user's letters are static. Further, there is no way for a user to impart situation specific advice, encouragement or to provide interaction with his children, relatives or friends have he or she has passed. The system and method of the present invention solves these and other problems in the prior art.

SUMMARY OF THE INVENTION

According to one preferred embodiment, a system for system for an interactive query comprises a first input module capable of receiving input for creating a simulated personality for a first user; an expert system capable of creating and storing the simulated personality; an output module for presenting the simulated personality to a second user; and an interactive query module capable of allowing the second user to communicate with the simulated personality of the first user.

According to another preferred embodiment, a method for an interactive query comprising: receiving input for creating a simulated personality for a first user; creating and storing the simulated personality; presenting the simulated personality to a second user; and allowing the second user to communicate with the simulated personality of the first user.

DETAIL DESCRIPTION OF THE PREFERRED EMBODIMENT OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Fundamental characteristics of personality of a user 100 can include: (1) consistency—essentially, any user act in the similar ways in a variety of situations and there is a recognizable order and regularity to behaviors, (2) psychological and physiological—personality is a psychological construct, but it can be influenced by biological processes and needs, (3) behaviors and actions—personality not only influence how a user respond in a particular environment, but also causes a user to act in certain ways, (4) multiple expressions—personality is displayed in more than just behavior. It can also be seen in thoughts, feelings, close relationships and other social interactions.

Various parameters can be used and updated in order to simulate personality of a user at any point in their life. These parameters may include, by way of example, and not by way of limitation: (1) relational psychology—situations and decisions that can prove revealing, (2) personality profiles—questions that define the character, (3) inner traits—analysis of preferences such as drawing style and handshake, (4) love test—scenarios that attempt to explain outlook on love, (5) shape test—shapes and symbols that reveal personality characteristics, (6) food test—how food and drink preferences relate to personality, (7) color test—color preferences, (8) internal beliefs—values, moral beliefs, political beliefs and spiritual beliefs, (9) personal details—age, family background, education, profession and external environment, (10) personal interviews—utilizing a speech recognition algorithm and/or a natural language processing algorithm, (11) personal library of audios and videos, and (12) what others think & say.

An expert algorithm, by way of example, and not by way of limitation, an artificial intelligence algorithm and/or a neural network algorithm, can synthesize results of the above parameters and can simulate closely the personality of a user.

Figure 3:
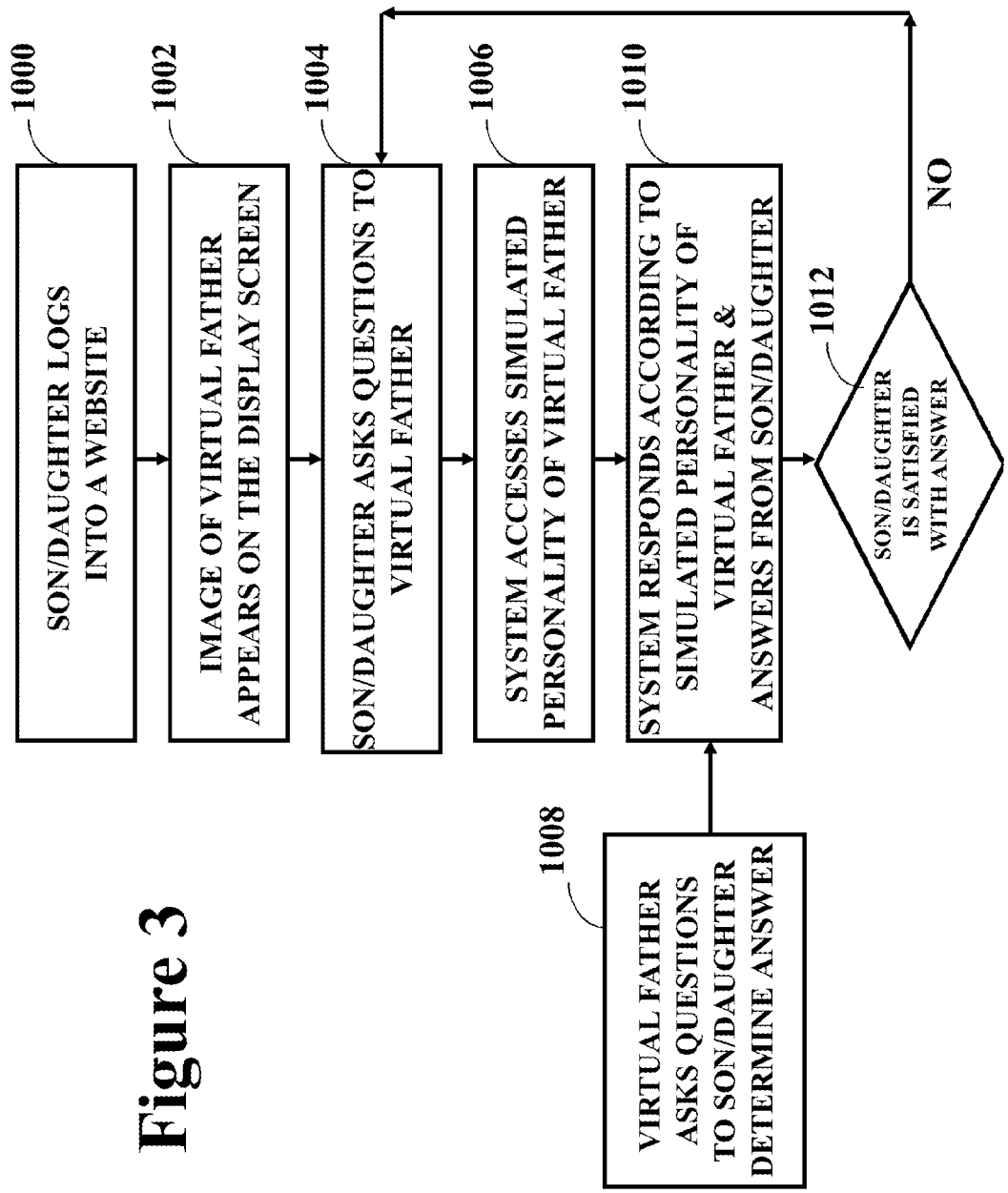
FIG. 3 is a flow diagram illustrating the steps performed by a system and method for an interactive query utilizing a simulated personality in accord with one embodiment.

Referring to FIG. 3, a flow diagram illustrates the steps performed by a system and method for an interactive query utilizing a simulated personality in accord with one embodiment. In step 1000, a family member, friend, coworker or employer, by way of example, and not by way of limitation, a son or daughter, logs into a website. In step 1002 an image of the user, in this example, a virtual father, may appear on a screen. In step 1004 the son or daughter may asks questions. Such questions may include life's questions, by way of example, and not by way of limitation, should I buy a house? to virtual father. In step 1006 a system may access the simulated personality of a virtual father, integrated with a knowledge bank 440. In step 1008, the virtual father asks questions, by way of example, and not by way of limitation, did you find a stable job? to the son or daughter for clarification and background of the question asked by the son or daughter. In step 1010 virtual father responds to son's or daughter's question. In step 1012, if the son or daughter is satisfied with virtual father's answer, then the son or daughter stops, otherwise the process is reiterated until the son or daughter is satisfied with the answers from the virtual father.

Figure 4:
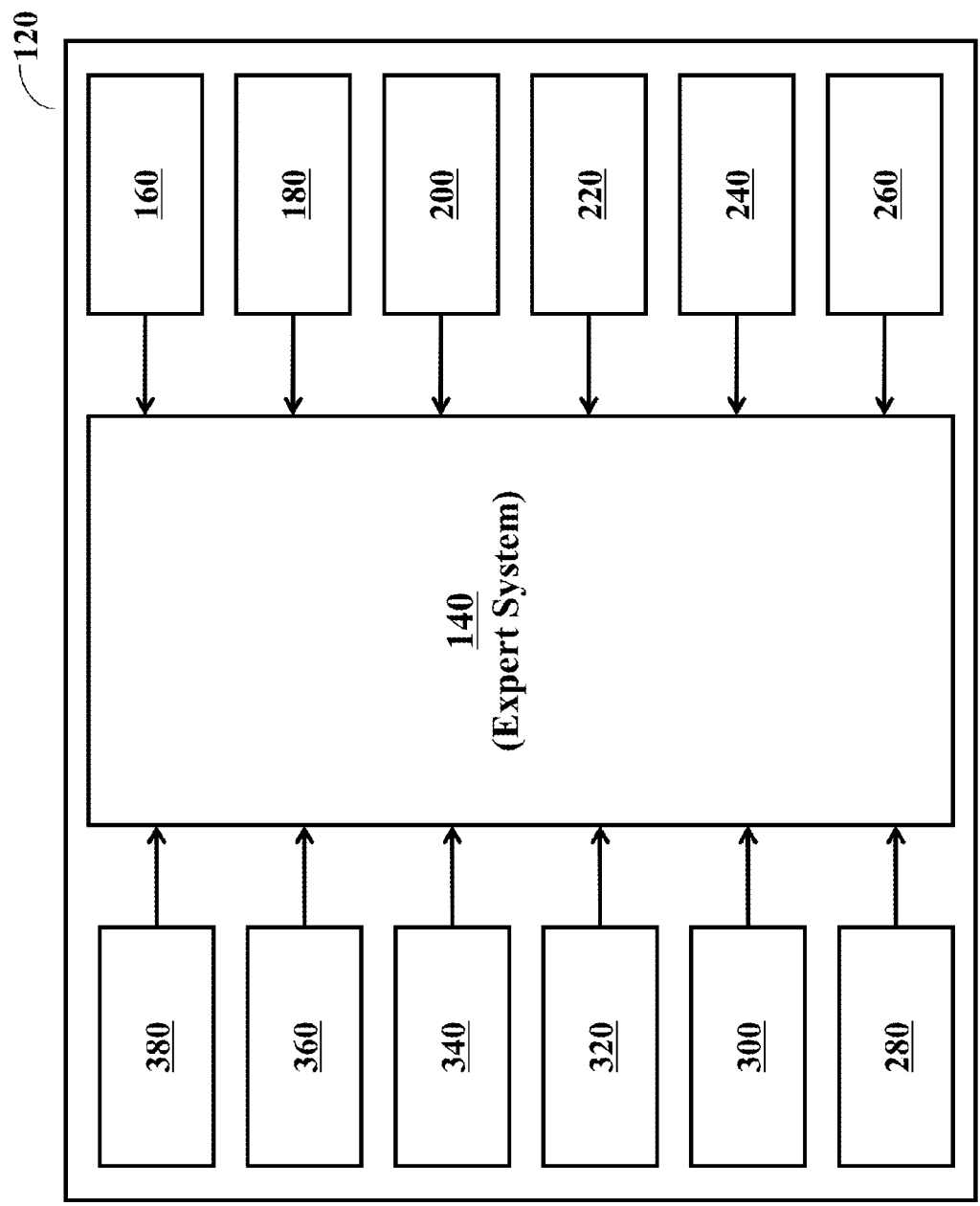
FIG. 4 is a flow diagram illustrating data flow for providing close simulation of a personality of a user by an expert algorithm according to the embodiment of FIG. 3.

Referring to FIG. 4, a flow diagram illustrates data flow for providing close simulation of a personality of a first user (such as the virtual father of FIG. 3) by an expert algorithm, artificial intelligence algorithm and/or a neural network algorithm. For example, the system may store a snapshot of a personality 120 of a user at a time $t=t_1$, as the system may store several snapshots of the user's personality 120 at different times $t_n$. The closely simulated personality 120 of a user 100 may be configured to synthesize various input modules 160 to 380, as listed below.

| Input Modules | Description of Input Modules For a User |
| --- | --- |
| 160 | Relational Psychology |
| 180 | Personality Profiles |
| 200 | Inner Traits |
| 220 | Love Test |
| 240 | Shape Test |
| 260 | Food Test |
| 280 | Color Test |
| 300 | Internal Beliefs |
| 320 | Personal Details |

-continued

| Input Modules | Description of Input Modules For a User |
|---|---|
| 340 | Personal Interviews |
| 360 | Personal Library of Audios, Videos & Wisdom |
| 380 | What Others Think & Say |

Such a system may be use the above inputs to create a closely simulated personality 120 is available from Electronic Arts of Redwood City, Calif., United States, as used in The Sims® series of video games. For example, in both The Sims® and The Sims® 2, personality is split into 5 sections: Niceness, neatness or cleanliness, outgoingness, activeness, and playfulness. It is normally related to a Sim's Zodiac sign, but there are exceptions.

Each section uses a zero-to-ten scale. The scale is actually 0 to 10.00 in The Sims® game, which could be applied to input modules 160, 180, 200, 220, 240, 260, 280, 300 320, 340, 360 and 380. In The Sims®, each section is split into three parts; 0-2, 3-7, and 8-10, each of which has a name and a description. The Sims® 2 uses personality scales that can be divided into low, medium, and high, which can be alternatively used in the present system to store the personality 120 too. In The Sims® 2, low is generally less than 4, and high is generally 8 (or 8.01) and above. In The Sims® 3, the personality points system was replaced with traits, which could also be used as an alternative to store the personality 120.

In The Sims®, children get personality points when they grow up from being babies. Most of what they call the townies get random personality points, though they may not receive them until they first appear in-game.

In The Sims®: Livin' Large®, the chemistry set can make a potion that reverses personality points. The only way to get them back would be to recreate the potion. A Sim abducted by aliens would return with an altered personality. Sims can change their personality one point at a time by using what is called the Crystal Ball. In The Sims® 2, aspects of a simulated personality 120 may be changed via what is called the Encourage interaction.

These qualities in The Sims® are sometimes referred to as traits, many of which mirror the above described input modules 160, 180, 200, 220, 240, 260, 280, 300 320, 340, 360 and 380.

Over the user's lifetime, a snapshot of the user's simulated personality 120 may be stored. By way of example, and not by way of limitation, every year, two years, or five years, a user may decide to add another snapshot simulated personality 120 to the system, along with the user's age at the time in order to organize the snapshots into age personality simulation 120 snapshots.

Personality questions provided to the user in input modules 160, 180, 200, 220, 240, 260, 280, 300 320, 340, 360 and 380) may be answered at a time $t=t_1$ at which time the answers are graded in scale and stored as in the Electronic Arts® Sims® system. This method is then repeated for each snapshot simulated personality 120 at time $t_2, t_n$.

With each snapshot, integration of a simulated personality 120 of a user 100 with one or more image(s) of the person may further be taken and stored. In one embodiment, a three-dimensional (3-D) telepresence-like holographic image may be captured in near-real-time to represent the user to produce a combination 3-D representation and combined simulated personality 120 that can be termed an image personality (420 in FIG. 5) of a first user for each time $t_n$. In other embodiments, although less preferably because of lesser impact, the image personality may include only two dimensional (2-D) representations of the user at each time $t_n$.

As explained below, this will give the user's relatives and friends the ability to converse with the user's simulated personalities 120 based on the age of the user. In other words, a user's friends and family may be able to interact with the user's simulated personality 120 at the age of 10, then again at the age of 15, and then at the age of 20, 35, and so on, at their choosing.

Each image personality of a user may be stored in a cloud-based server to provide network-based access to friends or family members. By way of example, and not by way of limitation, an internet server may be connected to the internet for access through a secure connection such as secure socket layer (SSL) to the image personality snapshots. Social media connections may be used such as through Google+® or Face Book®.

Figure 1:
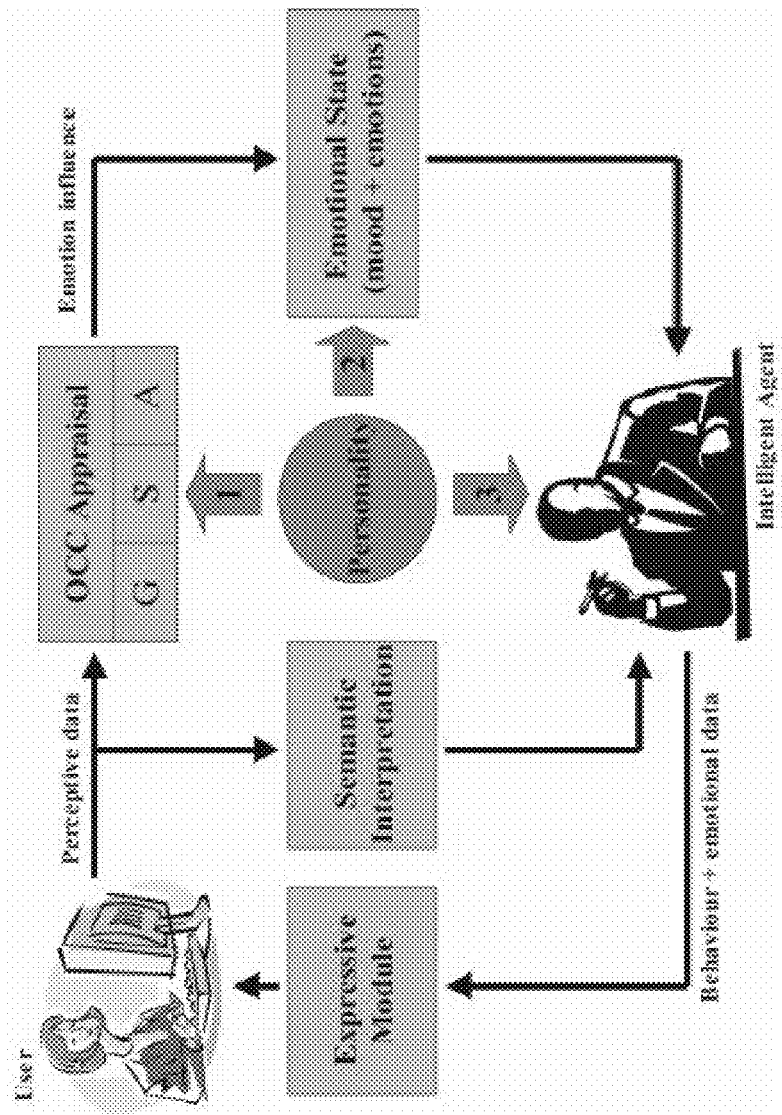
FIG. 1 diagramatic overview of a prior art intelligent agent framework for an emotional state and personality.
Figure 2:
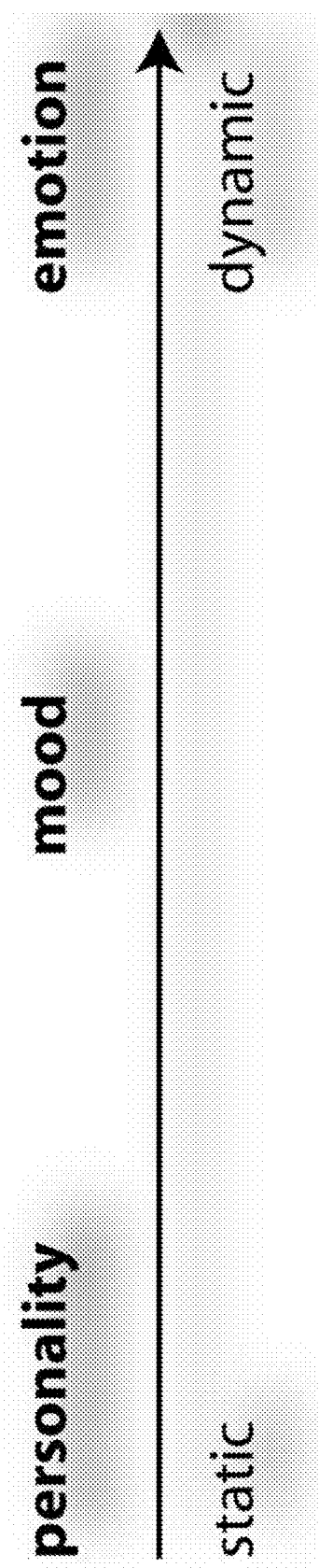
FIG. 2 is a prior art personality, mood and emotion scale from static to dynamic according to the prior art system of FIG. 1.
Figure 5:
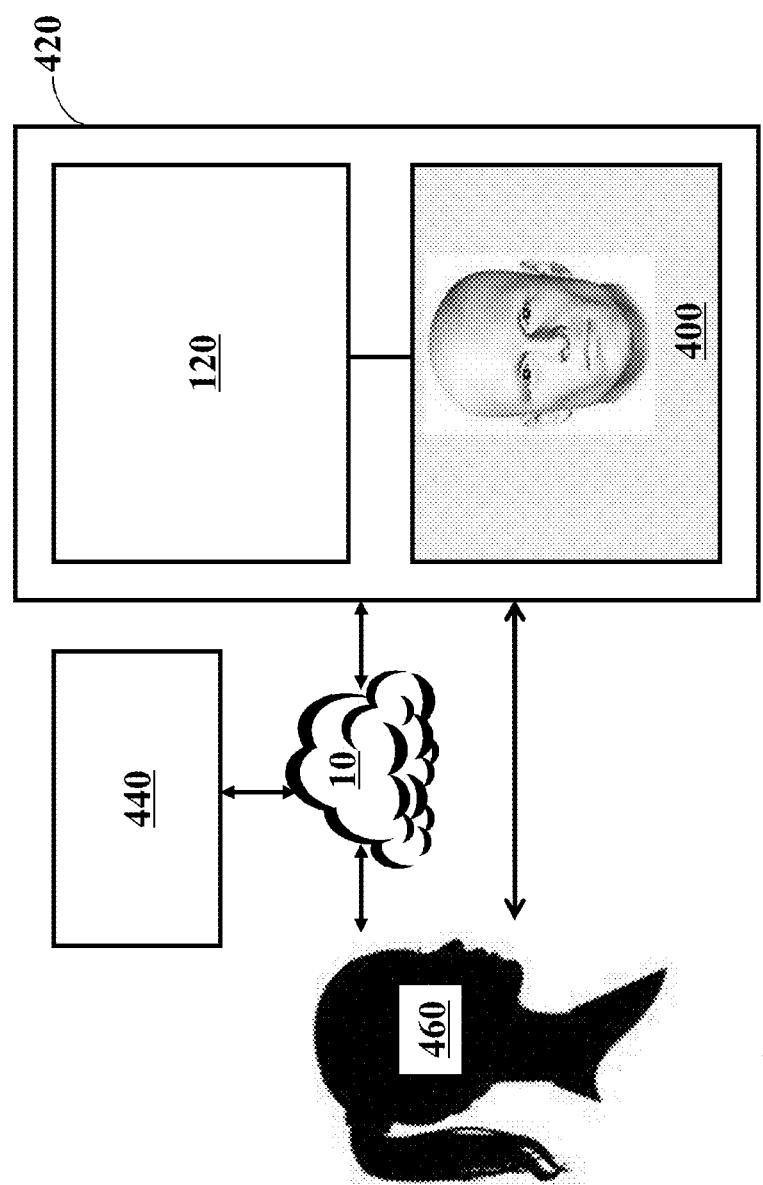
FIG. 5 is a diagramatic representation of an interaction between a user, a knowledge bank and an interactive query with another user according to the embodiment of FIG. 3.

With reference to FIG. 5, shown is a diagramatic representation of an interaction between the image personality 420 of a first user, a knowledge bank 440 and an interactive query with another user 460 according to the embodiment of FIG. 1. Interaction between the image personality 420 and the second user 460 may occur via voice, using voice recognition, or text, depending on the system. By way of example, and not by way of limitation, the image personality 420 and second user 460 may interact through voice conversation, wherein the second user 460 interactively communicates with a holographic 3D representation 400 of the first user. In another embodiment, by way of example, and not by way of limitation, on the other end of the scale of interactivity, interaction between the image personality 420 and the second user 460 may occur by means of e-mail or text communications. In yet another embodiment, by way of example and not by way of limitation, interaction may occur with real-time chat through a Facebook®-type interface or other social-media-type chat interface.

For any of these embodiments, communications with the user 460 may be through a wide area network such as the internet 10 or world-wide-web.

In some embodiments, image 400 may comprise an animated or still 2D image for the image personality 420 at time $t_n$. For example, if the firs user first provided a personality profile and image of him or herself when he was 15, then the second user 460 who is communicating with the image personality 420 at time $t_1$ may see or interact with the representation 400 of the first user that the user uploaded when he or she was 15. If the next time the first user had provided a personality profile was when he or she was 25, then if the second user 460 communications with the $t_2$ image personality 420, the second user 460 would be viewing the image of the first user that she provided when he or she was 25.

Arjan Egges, Sumedha Kshirsagar and Nadia Magnenat-Thalmann of MIRALab—University of Geneva, describe an application with a visual front end that can be used in some embodiments of the present system in their paper titled Generic Personality and Emotion Simulation for Conversational Agents, Published in Computer Animation and Virtual Worlds archive, Volume 15 Issue 1, March 2004 Pages 1-13. As described therein, a graphical front-end comprises of a 3D talking head capable of rendering speech and facial expressions in synchrony with synthetic speech. The facial animation system interprets the emotional tags in the responses, generates lip movements for the speech and blends the appropriate expressions for rendering in real-time with lip synchronization. Facial dynamics are considered during the expression change, and appropriate temporal transition functions are selected for facial animation.

MPEG-4 facial animation parameters are used as low level facial deformation parameters. A system that provides the details of the deformation algorithm that can be used in one embodiment are explained in S. Kshirsagar, S. Garchery, and N. Magnenat-Thalmann, *Deformable Avatars*, Feature Point Based Mesh Deformation Applied to MPEG-4 Facial Animation, pages 33-43, Kluwer Academic Publishers, July 2001. However, for defining the visemes and expressions, principle components described by Kshirsagar et al. in S. Kshirsagar, T. Molet, and N. Magnenat-Thalmann, *Principal components of expressive speech animation*, Proceedings Computer Graphics International, pages 59-69, 2001. The principle components are derived from the statistical analysis of the facial motion data and reflect independent facial movements observed during fluent speech. They are used as high level parameters for defining the facial expressions and visemes. The use of principal components facilitates realistic speech animation, especially blended with various facial expressions. The main steps incorporated in the visual front-end are the following:

1. Generation of facial animation parameters (FAPs) from text: Available text-to-speech (TTS) software that provides phonemes with temporal information may be used for this component. Co-articulation rules may be applied based on the algorithm described in M. M. Cohen and D. W. Massaro, *Modelling Co-Articulation In Synthetic Visual Speech*, pages 139-156, Springer-Verlag, 1993, which may be adopted for use with the principal components.

2. Expression blending: The dialogue system may output expression tags with the text response. Each expression is associated with an intensity value. An attack-sustain-decay-release type of envelope may be applied for the expressions and it is blended with previously calculated co-articulated phoneme trajectories. This blending is based on observed facial dynamics, incorporating the constraints on facial movements wherever necessary in order to avoid excessive/unrealistic deformations.

3. Periodic facial movements: Periodic eye-blinks and minor head movements may be applied to the face for increased believability.

In order to help the image personality 420 to respond to the questions and interactions of the second user 460, an online knowledge bank may be accessed by the image personality 420. Although when the first user created the image personality, he or she may have inputted as much has he or she could regarding how he or she would respond to one or more second users 460 who may ask questions of his or her image personality, 460, it unlikely that the first user could have provided all of the knowledge necessary for any conceivable present or future knowledge-based question that the second user 460 could ask. For example, a second user's grandfather who might be the first user may not have much knowledge of smart phone technology when he created his image personality at time $t_n$.

If the second user 460 asks a question related to smart phones of the image personality 420, it would not be desirable for the image personality to decline to answer the second user 460 because of such a lack of knowledge. Thus, instead of declining to answer, the image personality 420 may access a knowledge bank 440 in order to gain knowledge regarding the subject matter of a question to provide an answer that is commensurate with the personality of the image personality 420 at time $t_n$. Such a knowledge bank may comprise, by way of example and not by way of limitation, Wikipedia®, provided by the Wikipedia Foundation, Inc. of San Francisco, Calif., accessed through the internet 10.

A cognitive system such as the Watson® system provided by IBM Corporation of Armonk, N.Y., may be used to then interpret the question from the second user 460, and access the knowledge bank 440 to understand the question and determine one or more possible responses based on the knowledge bank 440. Which of the one or more possible responses is actually provided to the second user 460 depends on the image personality 420 of the first user. The possible responses may be put into, by way of example, and not by way of limitation, the OCC model discussed by Arjan Egges, Sumedha Kshirsagar and Nadia Magnenat-Thalmann of MIRALab—University of Geneva, in their paper titled Generic Personality and Emotion Simulation for Conversational Agents, Published in Computer Animation and Virtual Worlds archive, Volume 15 Issue 1, March 2004 Pages 1-13. For example, if the image personality 420 of the grandfather suggests that the grandfather is economically frugal, then the OCC model may suggest that to the second user 460 that the cheapest smart phone should be purchased the second user 460.

As with social media applications, such as Facebook®, certain levels of services in one embodiment may be offered for free, with banner, pop-up, impression, or other types of paid advertiser support. However, in other embodiments, instead of, or along with, advertiser support, support may be provided by charging for paid subscription services, including pay-per-question (PPQ) charging for asking questions of the image personality 420 of a user 100. In yet other embodiments, the above-described paid support mechanisms may be combined with, or replaced by set-up fees paid by the first user whose personality is imaged.

Figure 6A:
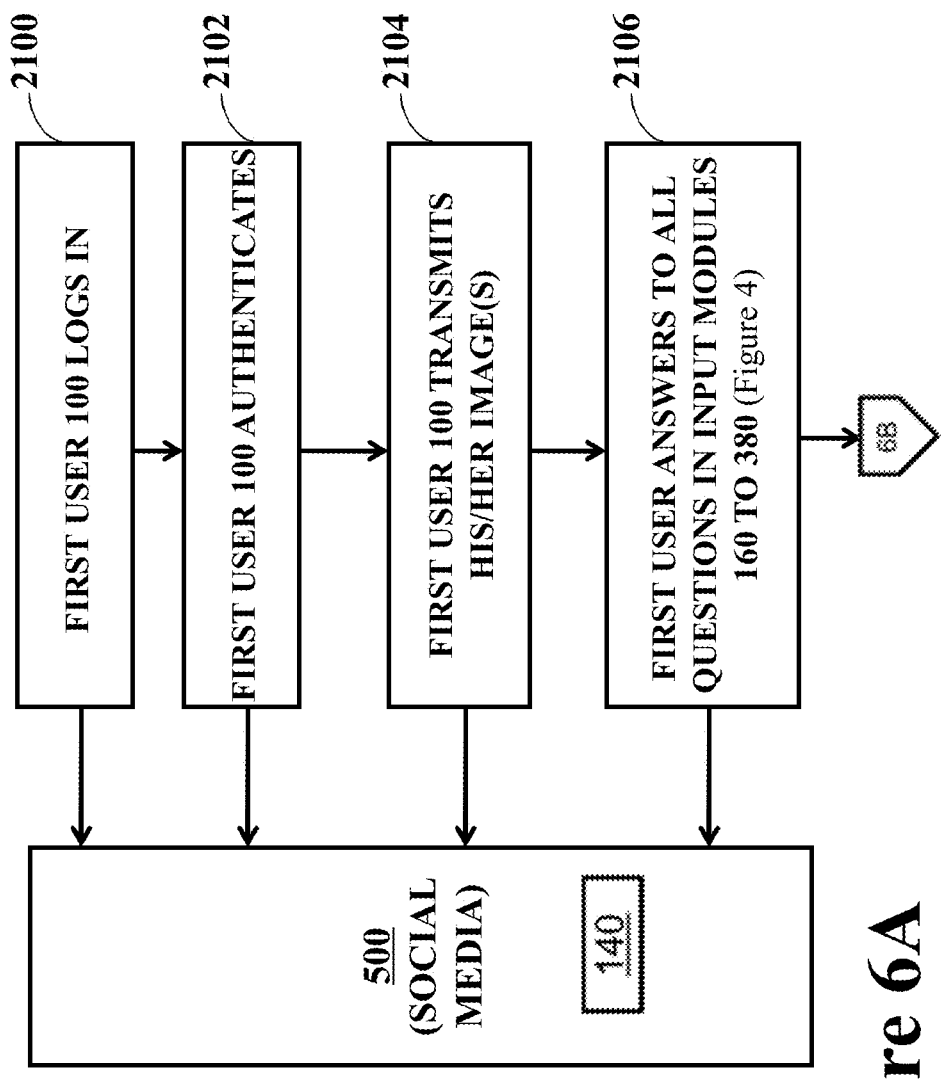
FIGS. 6A-6C illustrate a dataflow diagram showing dataflow in a social relationship according to the embodiment of FIG. 3.
Figure 6B:
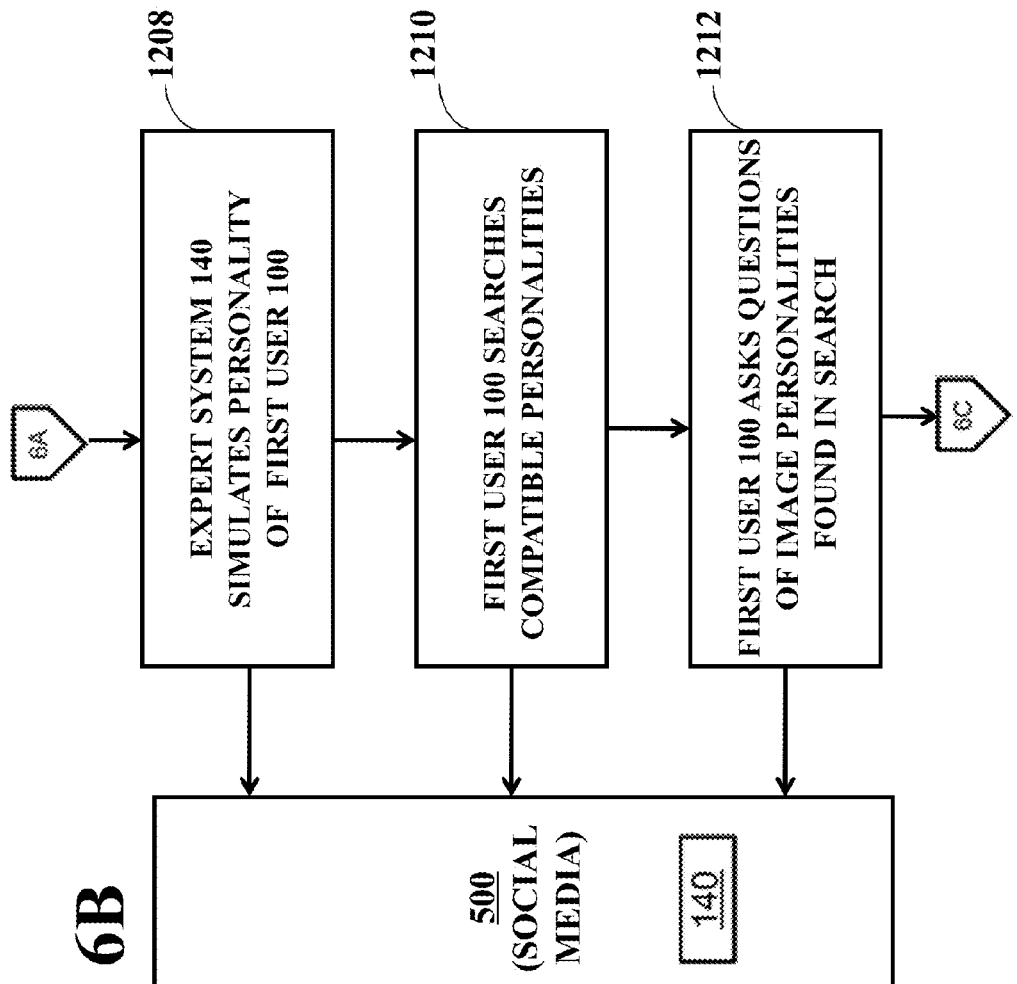
Figure 6C:
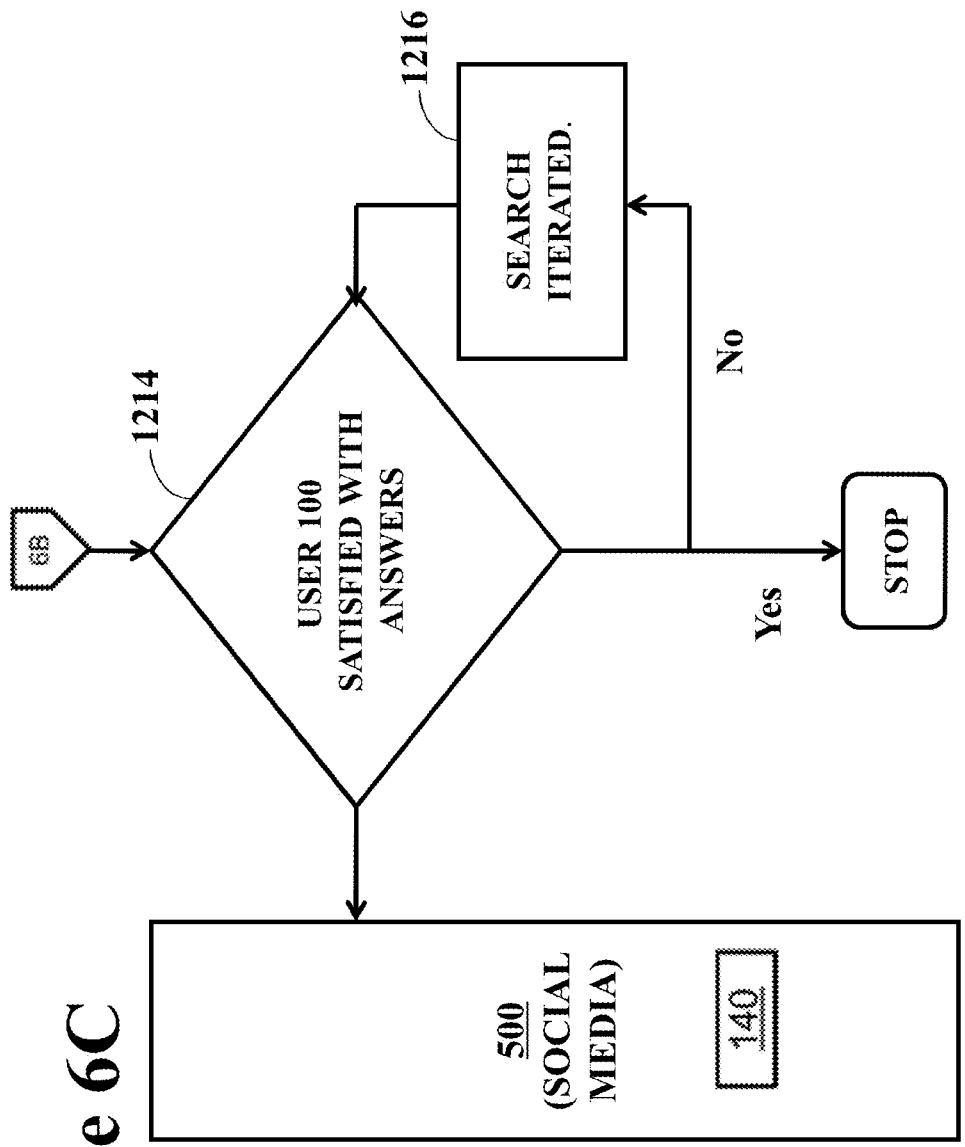

With reference to FIGS. 6A-6C, a dataflow diagram shows dataflow in a social media relationship according to the embodiment of FIG. 3. The dataflow diagram of these figures describes a real-life application of the image personality 420 of the second user 460 in social relationship with the image personality 420. The embodiment of FIGS. 6A-6C might describe such a relationship in a dating or friend finder website, although not exclusively.

With reference specifically to FIG. 6A, in step 2100, the first user 100 logs into a social media or social networking web portal 500 (called a social media portal herein). In step 2102, the first user 100 authenticates in social media portal 500. In step 2104 the first user 100 transmits his or her image to social media portal 500. In step 2106, the first user 100 answers (in the form of a voice and/or short message text and/or e-mail command) all questions related to the input modules 160 to 380. In step 4004, the expert system 140, which, by way of example, and not by way of limitation, may comprise an artificial intelligence system, or a neural network system, simulates the image personality 460 of the first user 100. The expert system 140 is shown as co-existing with social media portal 500 server, but those skilled in the art would recognize that the expert system 140 may be located off site from the social media portal 500 server with a connection through the internet (10 in FIG. 5).

Continuing from the flow diagram in FIG. 6A, moving to FIG. 6B, in step 1208, as an optional shortcut to create the first user's image personality 420, the first user 100 may search through model or previously entered image personalities that may closely match his or her own image personality. For example, text or voice-driven searches may be performed describing basics of the first user's personality for compatible image personalities 420 of other users in the social media portal 500. As part of this search, in step 2110, the first user 100 may ask questions to one or more compatible image personalities 420 of other users in social media portal 500 to determine if one or more of those image personalities 420 are close enough to his or her own personality.

In step 1214, if the first user 100 is satisfied with answers from his or her search of similar image personalities 420, then search of compatible image personalities 420 of other users in social media portal 500 is stopped. Otherwise in step 1216, the search of compatible image personalities 420 of other users continues.

Figure 7A:
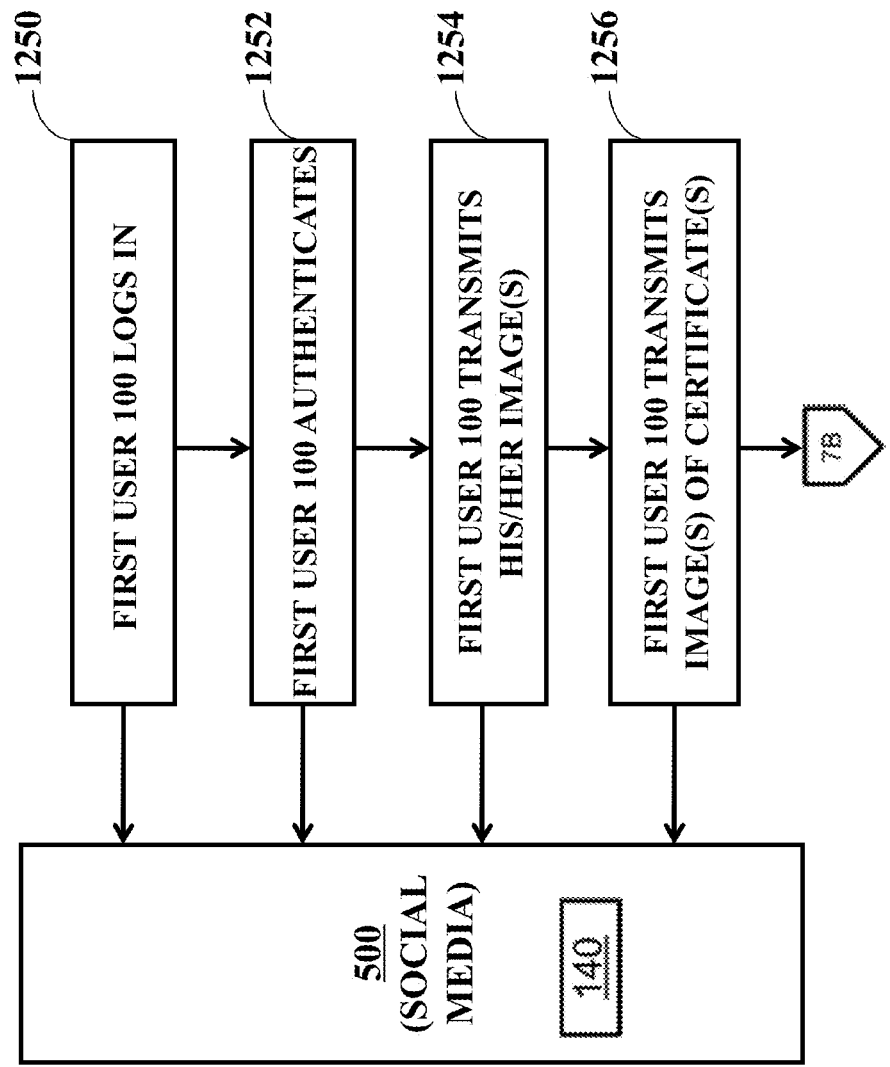
FIGS. 7A-7C illustrates a dataflow diagram showing dataflow during the interaction of the image personality of a user in employment screen according to the embodiment of FIG. 3.
Figure 7B:
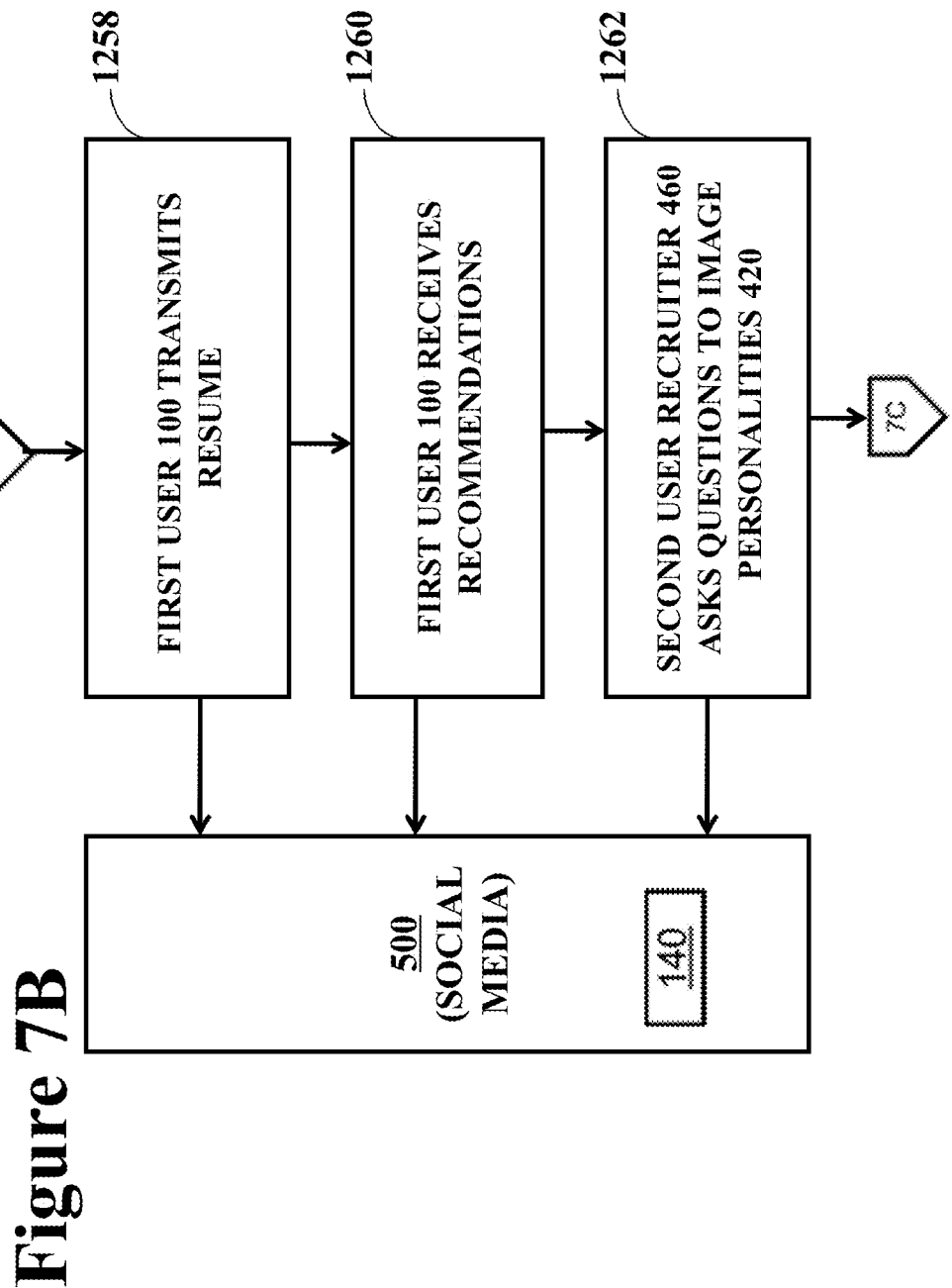
Figure 7C:
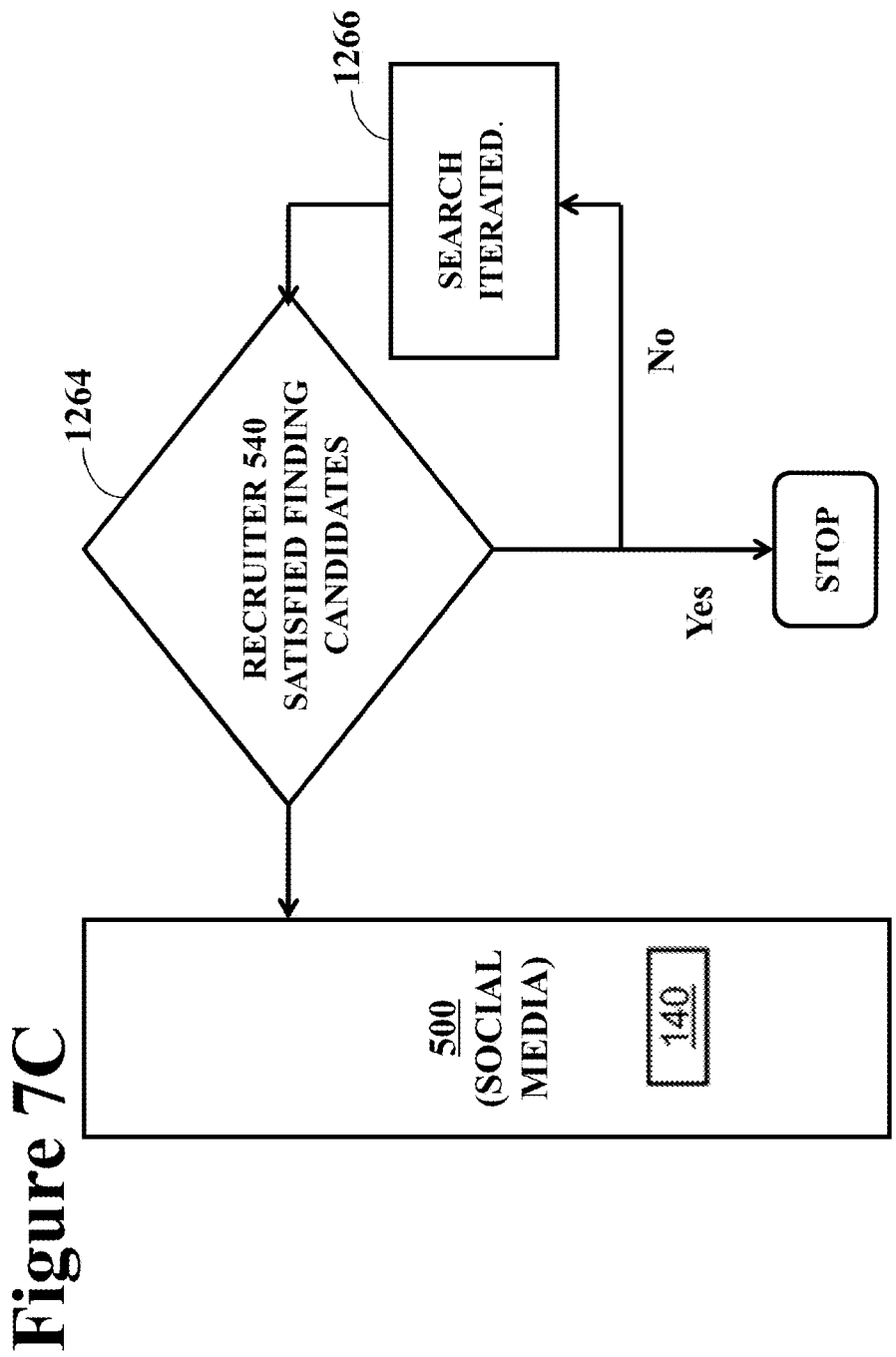

Those of skill in the art can readily recognize how the system described herein can be applied to an employment screen system to great advantage of in-house or outside employment recruiters. With reference to FIGS. 7A-7C, a dataflow diagram illustrates dataflow during an interaction of the image personality 420 of a first user 100 applying for employment in an employment system according to the embodiment of FIG. 3. With specific reference to FIG. 7A, in step 1250, a first user 100 applying for a position logs in to the social media web portal 500. In step 1252, the first user 100 authenticates in social media web portal 500. In step 1254 the first user 100 may transmit his or her image to the social media web portal 500. In step 1256, the first user 100 may transmit images of his or her educational certificates and diplomas to the social media web portal 500.

Continuing to FIG. 7B, in step 1258, the first user 100 transmits his or her resume to the social media web portal 500. In step 1260, the first user 100 receives recommendations from other users to social media web portal 500 based on the first user's uploaded data. In step 1262, the second user 460, a recruiter, asks employment related questions of the image personalities 420 of all first users 100 who uploaded their job data and created image personalities 420 to seek employment.

Continuing to FIG. 7C, in step 1264, if the second user (recruiter) 460 is satisfied with answers to his or her questions by one of the image personalities 420, then search of other compatible candidates is stopped, otherwise in step 1266, the search for other compatible candidates is iterated until the second user 460 is satisfied in finding other compatible candidates.

Using the embodiment of FIG. 3, advertisements for a product and/or service can be targeted to a set of users (men or women) belonging to different groups of image personalities 420. By way of example, and not by way of limitation, five major personality traits in the image personalities 420 can be targeted using the system in the context of social media and/or social networking. Furthermore, men and women can have a difference in personality. In one embodiment, those five major personality traits might be extraversion, agreeableness, conscientiousness, emotional stability and openness to experience.

Figure 8:
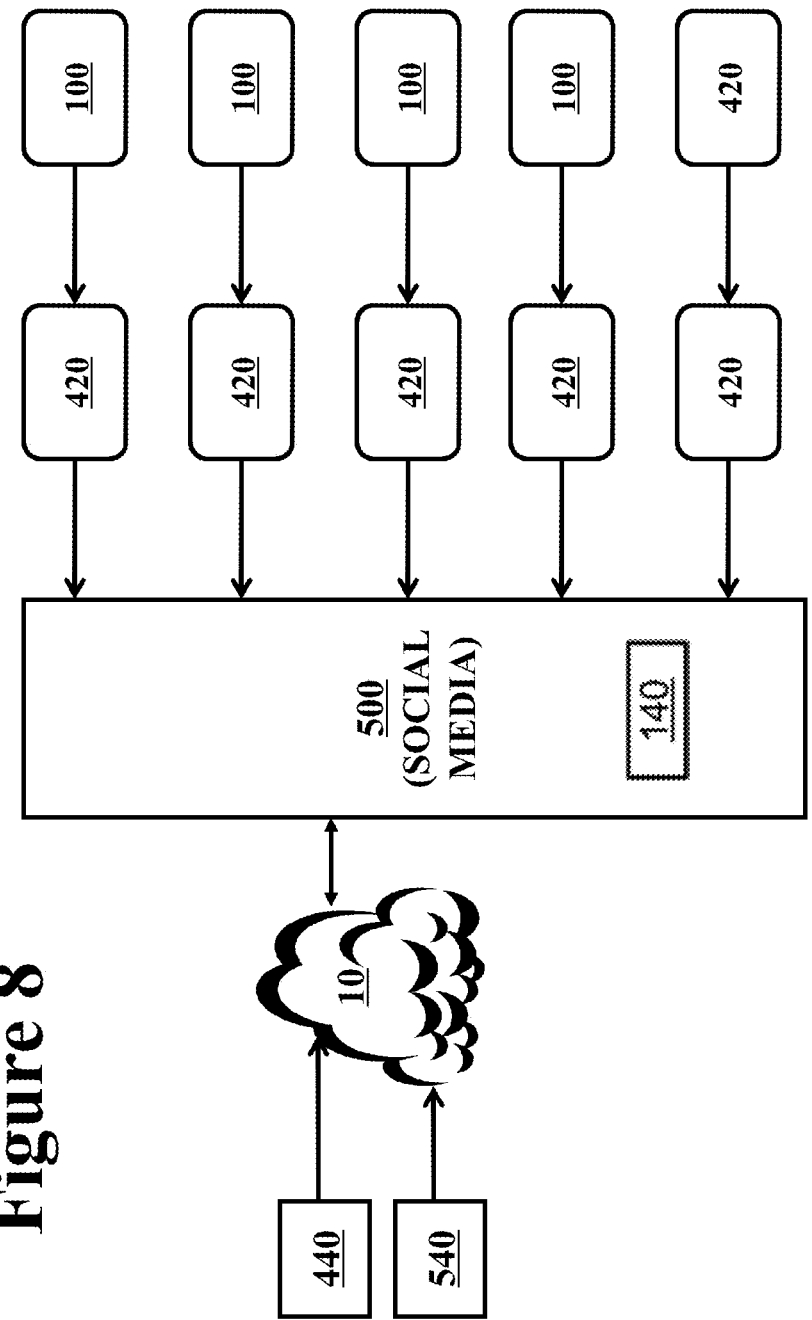
FIG. 8 is a dataflow diagram illustrating the data flow during application of the embodiment of FIG. 3 in an advertising system using social media in which a set of first users are targeted by virtue of their image personalities and genders.

With reference to FIG. 8, a system dataflow diagram illustrates data flow during application of the embodiment of FIG. 3 in an advertising system using social media in which a set of first users 100 are targeted by virtue of their image personalities 420 and genders specified within their gender personalities 420. An automated search agent 540 may be configured to scan social the media web portal 500 for image personalities 420 with, by way of example, and not by way of limitation, the five major personality traits referred to above, namely extraversion, agreeableness, conscientiousness, emotional stability and openness to experience. Further, the search agent 440 may also search the knowledge bank 440 to match certain key words and definitions to these five traits and other traits of the image personalities 420 to best provide a set of target users 100 for advertisements. Just as the knowledge bank 440 may comprise an online dictionary accessed through the internet 10, the search agent 540 may also access the knowledge bank 440 and the social media web portal 500 through the internet 10.

Figure 9A:
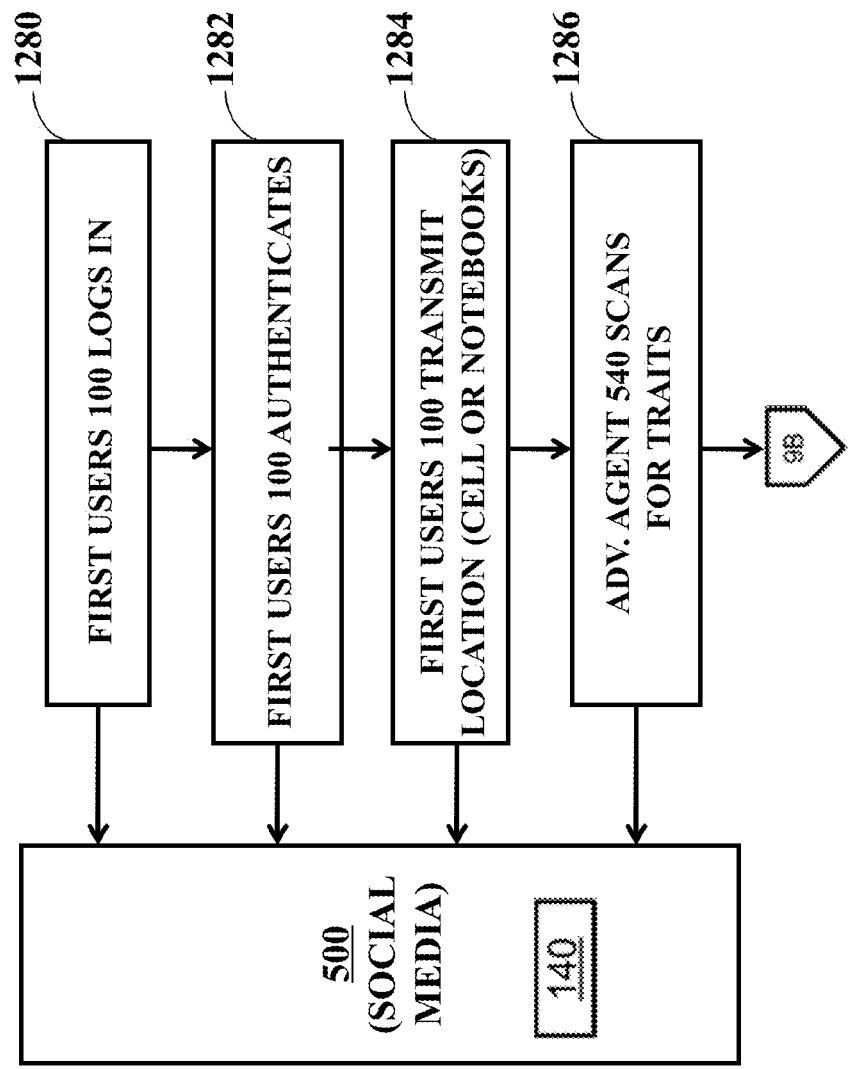
FIGS. 9A-9C illustrates a dataflow diagram showing dataflow during application of image personalities and genders of a set of first users in the context of real-time location based social advertisement or social commerce according to the embodiment if FIGS. 3 and 8.
Figure 9B:
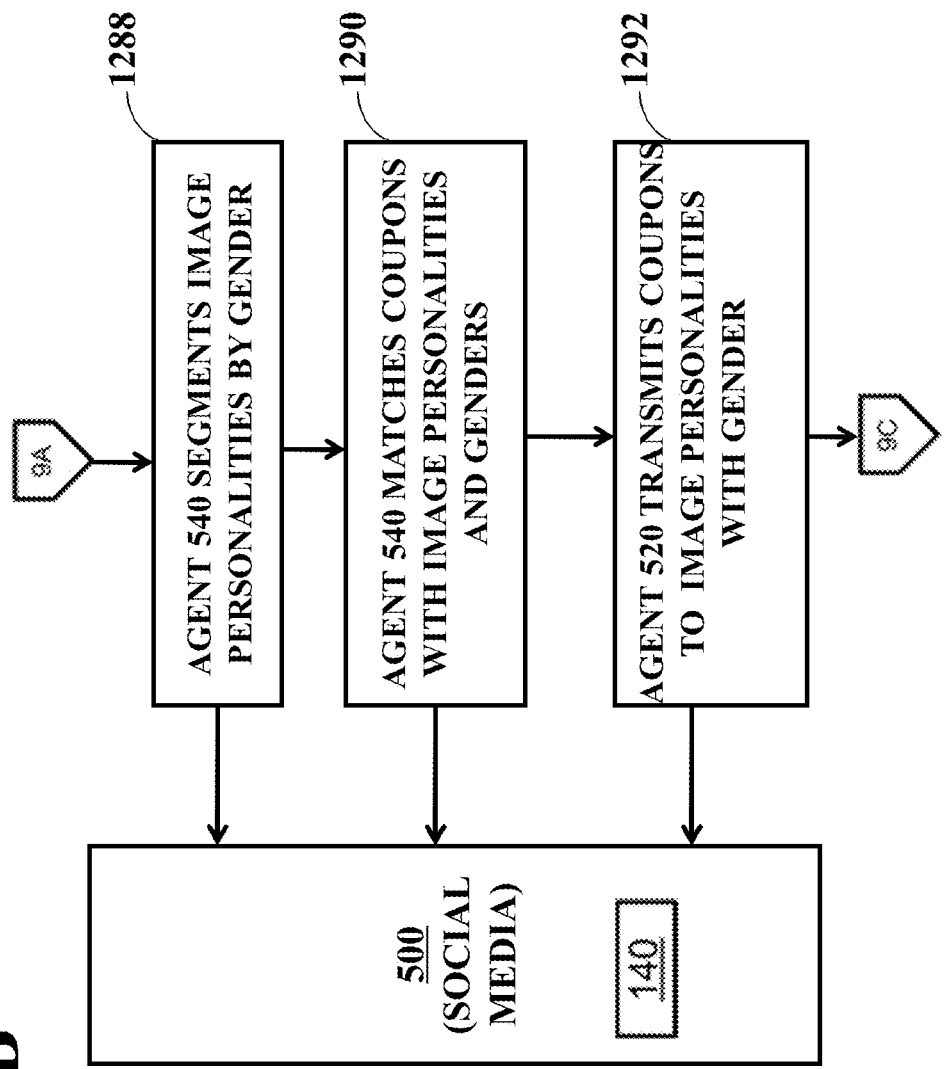
Figure 9C:
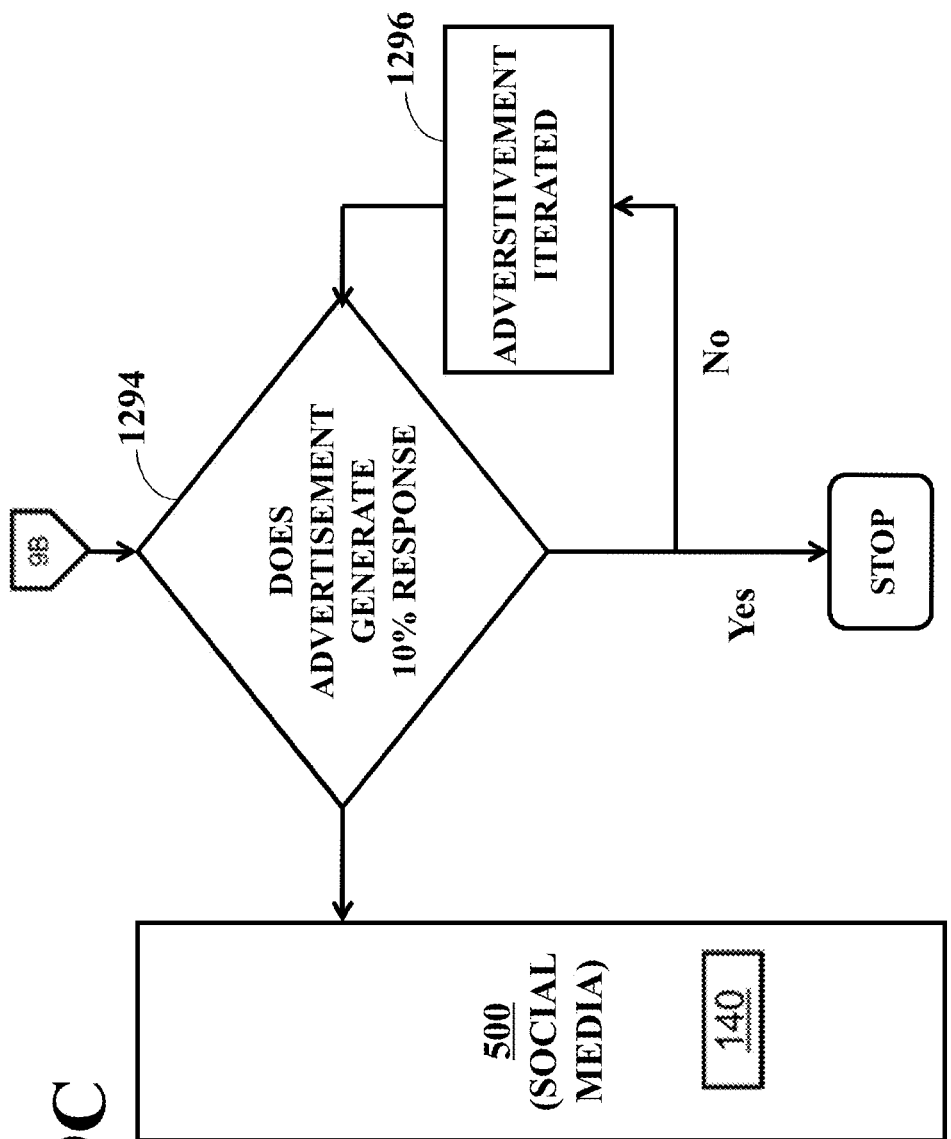

With reference to FIGS. 9A-9C, a dataflow diagram illustrates dataflow during application of image personalities 420 and genders of a set of first users 100 in the context of real-time location based social advertisement or social commerce application according to the embodiment if FIGS. 3 and 8. In step 1280, the first user 100 who have created image personalities 420 log into the social media web portal 500, presumable either at home or on their smart phones or notebook computers. In step 1282, the users authenticate in the social media web portal 500. In step 1284, the respective electronic devices of the first users 100 transmit their location to the social media web portal 500. Alternatively, if any of the electronic devices of the first users 100 are not able to transmit their locations in real time, then first users 100 have the option of checking-in to the social media portal 500 with their location. In step 1286, the advertising search agent 540 may scan for the image personalities 420 of the users 100 with the traits desired by one or more advertisers.

Continuing with FIG. 9B, in step 1288, the advertising search agent 540 may further segment the image personalities 420 found in the step 1286 by gender. In step 1290, the advertising search agent 540 matches products and/or services for the first users 100 with their respective image personalities and genders. In step 1292, the social media web portal 500 may then be directed by the advertising search agent 540 to transmit coupons or advertisements for the advertiser's products and/or services to the users 100 of the matched image personalities.

Advertising success may be measured as a response rate percentage. For example, advertisers may consider ten percent (10%) to be a response rate that indicates a successful advertising campaign. In one embodiment after the coupons are sent to the users 100 with the matched image personalities and genders, when coupons are used at point of sale systems or scanned by service providers, the social media portal 500 may receive the use or response percentage directly or from the advertisers. In step 1294, the social media portal 500 may determine if a threshold desired response percentage, otherwise the advertisement is reiterated in step 1296, with, for example, adjusted traits searched.

Figure 10:
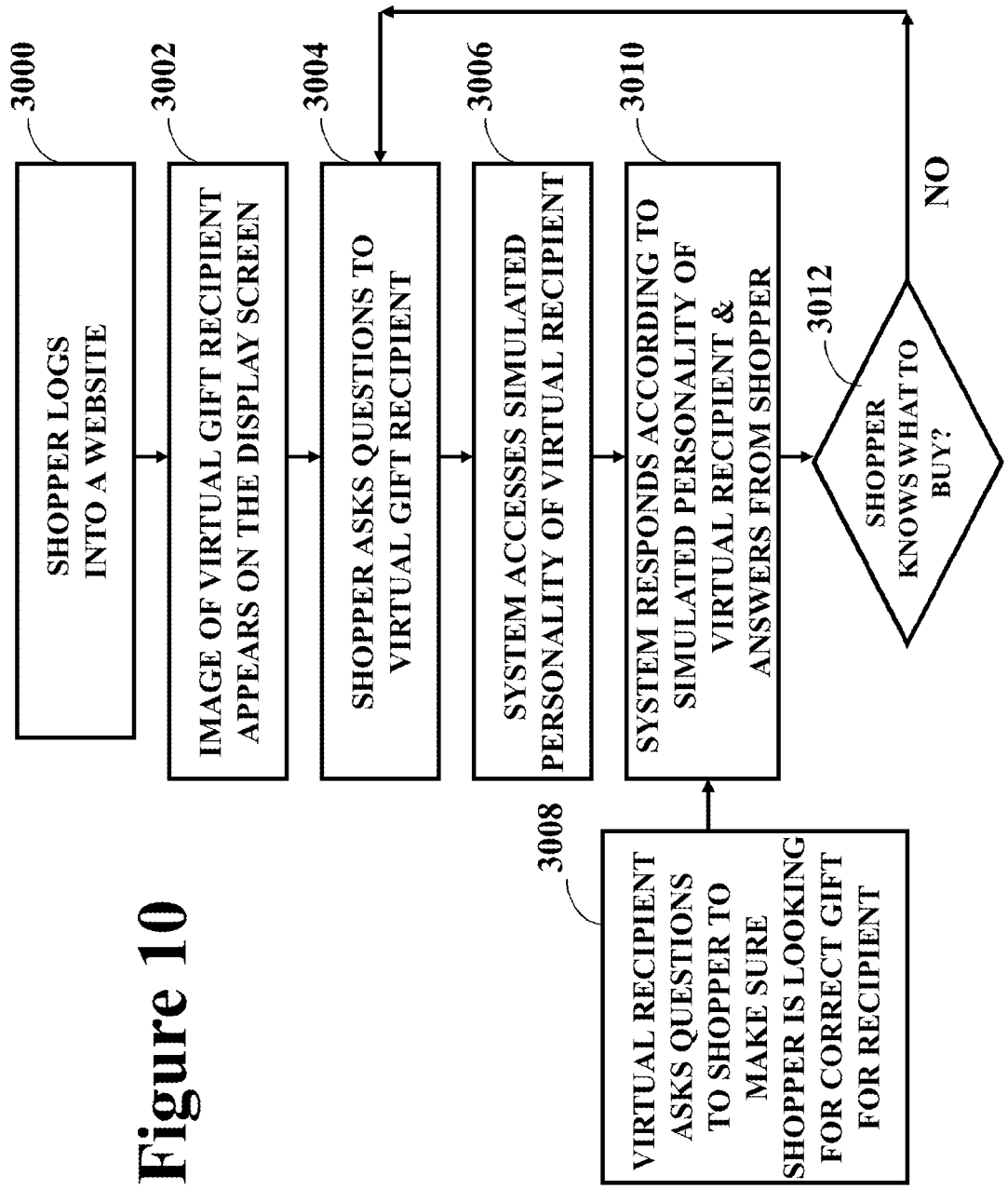
FIG. 10 is a flow diagram illustrating the steps performed by a system and method for an interactive query utilizing a simulated personality in accord with one embodiment to aid a shopper in buying a gift.

With reference to FIG. 10, a flow diagram illustrates a method in which one embodiment may be used to provide assistance to a shopper trying to purchase a gift for a recipient. In this regard, the user 100 would be a recipient of the gift whose image personality 420 has been stored in the social media portal 500, and second user 460 would be a shopper. In this regard, in step 3000, a shopper logs into the website of the social media portal 500. In step 3002 an image of the first user 100, in this example, a virtual gift recipient, may appear on a screen. In step 3004 the shopper (second user 460) may ask questions. Such questions may include questions regarding likes, dislikes, and other indicators of what the recipient may like, by way of example, and not by way of limitation, do you like diamonds, or what is your birth stone? to the virtual recipient (image personality 420). In step 3006 a system may access the simulated personality 420 of the recipient (user 100), integrated with the knowledge bank 440. In step 3008, the virtual recipient may ask questions, by way of example, and not by way of limitation, is there a sale on perfume at the department store? to the shopper to try to direct the shopper in his or her purchasing decision. In step 3010 the virtual recipient may respond to shopper's questions. In step 3012, if the shopper has enough information to make a buying decision, then the shopper stops. Otherwise the process is reiterated until the shopper is satisfied with the answers from the virtual recipient enough to make such a purchasing decision.

Finally, with reference back to FIGS. 8, 9A-9C, and 10, those of skill would recognize that such an embodiment may be used for one or more first users 100 to receive suggestions or help with decisions based on the first user's own personality rather than a virtual one. As an example, a first user 100 may enter/answer his or her own personality 420 and, based on his or her wants, needs, likes, or dislikes, the system could recommend purchases and/or deliver answers that are more suited to the first user 100.

The above disclosed descriptions are only the most preferred embodiment of the present invention. However, it is not intended to be limiting to the most preferred embodiment of the present invention. Numerous variations and/or modifications are possible within the scope of the present invention.

I claim:

1. A system for an interactive query performed using digital hardware devices, comprising:
    a first input module capable of receiving input for creating a simulated personality for a first user;
    an expert system capable of creating and storing the simulated personality;
    an output module for presenting the simulated personality to a second user;
    an interactive query module capable of allowing the second user to communicate with the simulated personality of the first user;
    wherein the first input module comprises an interactive question and answer module for receiving input regarding personality traits of the first user;
    wherein the input module is further configured for receiving input for creating plurality of simulated personalities for the first user, each of the plurality of simulated personalities relating to a personality of the user at a time $t_n$;
    wherein the interactive query module is further configured for allowing the second user to select which of the simulated personalities of the first user with which to communicate; and
    wherein each time $t_n$ represents different age of the first user.

2. The system of claim 1, the interactive query module is e-mail based.

3. The system of claim 1, the interactive query module comprises a two-dimensional animated image of the first user.

4. The system of claim 1, the interactive query module comprises a holographic animated image of the first user.

5. The system of claim 1, wherein the second user comprises a relative of the first user postmortem.

6. The system of claim 1, wherein the second user comprises a potential dating match of the first user.

7. The system of claim 1, wherein the second user comprises a potential employer of the first user.

8. The system of claim 1, wherein the second user comprises a potential advertiser to the first user.

9. The system of claim 1, wherein the second user comprises a buyer of a gift for the first user.

10. The system of claim 1, wherein the second user comprises a automobile dealer and the first user comprises a potential buyer of an automobile.

11. A method for an interactive query, comprising:
    receiving input for creating a simulated personality for a first user;
    creating and storing the simulated personality;
    presenting the simulated personality to a second user;
    allowing the second user to communicate with the simulated personality of the first user;
    receiving input regarding personality traits of the first user;
    receiving input for creating plurality if simulated personalities for the first user, each of the plurality of simulated personalities relating to a personality of the user at a time $t_n$;
    allowing the second user to select which of the simulated personalities of the first user with which to communicate; and
    wherein each time $t_n$ represents a different a e of the first user.

* * * * *